United States Patent [19]

Helenius

[11] Patent Number: 5,032,358
[45] Date of Patent: Jul. 16, 1991

[54] RESISTANCE WELDING ELECTRODE OF CHALCOGENE BEARING COPPER ALLOY

[75] Inventor: Asko Helenius, Pori, Finland

[73] Assignee: Outokumpu Oy, Helsinki, Finland

[21] Appl. No.: 516,047

[22] Filed: Apr. 27, 1990

[30] Foreign Application Priority Data

May 9, 1989 [FI] Finland .................. 892214

[51] Int. Cl.$^5$ .................. C22C 9/00
[52] U.S. Cl. .................. 420/500; 148/11.5 C; 420/497
[58] Field of Search .................. 420/500, 497; 148/11.5 C

[56] References Cited

U.S. PATENT DOCUMENTS

| | | | |
|---|---|---|---|
| 2,268,940 | 1/1942 | Hensel | 420/500 |
| 4,492,602 | 1/1985 | Lee et al. | 420/500 |
| 4,650,650 | 3/1987 | Patel | 420/500 |
| 4,704,253 | 11/1987 | Yamasaki et al. | 420/500 |
| 4,710,349 | 12/1987 | Yamazaku et al. | 420/495 |
| 4,734,254 | 3/1988 | Nippert | 420/500 |
| 4,818,283 | 4/1989 | Grünthaler et al. | 420/469 |
| 4,859,417 | 8/1989 | Innocenti | 420/429 |

Primary Examiner—Upendra Roy
Attorney, Agent, or Firm—Dellett, Smith-Hill and Bedell

[57] ABSTRACT

The invention relates to a material for electrodes to be used in resistance welding. The working life of electrodes, particularly of those to be used in the spot welding of coated sheets, is now relatively short. The invention introduces a new electrode material in the form of a copper alloy containing, in addition to the conventional ingredients, at least 20 ppm tellurium or other chalcogene, such as selenium or sulphur; owing to this new electrode material according to the invention, the service life of an electrode increases substantially.

18 Claims, 3 Drawing Sheets

RESISTANCE WELDING ELECTRODE OF CHALCOGENE BEARING COPPER ALLOY

BACKGROUND OF THE INVENTION

The present invention relates to the materials of an electrode used in resistance welding. Currently the working life of electrodes, particularly of those to be used in spot welding, is relatively short. We have now developed a new electrode material, i.e. a copper alloy containing, in addition to the usual ingredients, a minimum of 20 ppm tellurium or other chalcogene, such as selenium or sulphur, and the service life of the electrodes has essentially increased owing to this new electrode material.

Spot welding is the most important method of fusion in the sheet metal industry. Automobile industry, for example, uses about $n \times 10^7$ spot welding electrodes yearly. The purpose of the electrode is to apply the pressure force and electric current required in the fusion, as well as to cool the spot after the current is switched off. Thus the electrode material must have good mechanical strength, also at elevated temperatures as well as both electric and thermal conductivity. In order to improve the resistance to corrosion in the products, the use of coated sheets, such as hot galvanized or electrogalvanized sheets, is strongly increasing, particularly in the automobile industry. Respectively the use of aluminium, for diminishing weight, also is increasing.

The resistance welding of uncoated sheets has, during the past decades, developed to a well controlled process. The use of new coated sheets, however, has brought along a number of problems. The service life of electrodes used in the resistance welding of coated sheets is only a fraction compared to those used in the welding of uncoated sheets, and the sticking of the electrode to the surface to be welded may detach the electrode from its holder. As a solution to the problem of wearing, there have been tried alloys that increase the softening temperature, such as CuCdl or CuAg6 (ISO 5182 A1/2 and ISO A4/3) as well as age-hardening alloys, such as for example CuCrl and CuCrlZr (ISO A2/1 and ISO A2/2). Any essential improvement as for the service life of electrodes has not, however, been achieved with these alloys. In corresponding fashion, there have also been used the alloy CuZr (RWMA Group A Class 1) and dispersion-hardened copper DSCu (RWMA Group C Class 20), which have satisfactory wearing and sticking properties.

The patent applications DE 3,443,131, JP 60,227,997 and JP 9,001,074 describe various ways of coating or surface treatment methods for electrodes, and the patent application DE 2,808,392 specifies a method for the special heat treatment of electrode material. According to the U.S. Pat. No. 4,327,272, the electrode tip can be provided with steel balls. As far as is known, none one of these electrode types are in production.

Solving of the wearing mechanism of a resistance welding electrode lays the basis for lengthening the service life of the electrode. While welding an uncoated sheet, the strength, hardness and high softening temperature of the electrode help avoid the deformation of the electrode, and ensure a lengthy service life. However, while welding coated steel sheets or aluminium sheets, even the improving of the above mentioned properties does not lead to a satisfactory result, because a certain factor, even more essential to the outcome than the deformation, is the interaction of the electrode material and the surface of the sheet to be welded.

While welding a zinc-coated sheet with a copper-based electrode, the zinc of the coating and the copper of the electrode together form at the boundary surface an CuZn alloy with low conductivity. The alloying makes the electrode stick onto the sheet and may even detach the electrode from its adapter. On the other hand, the breaking of the CuZn layer on the electrode side wears the electrode rapidly. Moreover, the detaching may take place locally and cause spot-like pits in the electrode surface. During welding, these pits are quickly filled with Cu, Zn and Fe oxides, which are not electroconductive. This causes the current to be distributed unevenly in the object to be welded, and consequently creates an indefinite, unacceptable welding spot (nugget).

As already was maintained above, the requirements as for the usability and service life for the material of resistance welding electrodes include, among others, good thermal and electric conductivity, good mechanical strength and high softening temperature, which are achieved by alloying, and by means of work hardening, or precipitation hardening or dispersion hardening. In addition to this, it is important that the electrodes do not easily stick or form pits.

SUMMARY OF THE INVENTION

Copper and its alloys make good material for resistance welding electrodes, owing to their good thermal and electroconductivity, as well as their workability. While welding zinc-coated sheets, problems with the working life and usability of the electrodes emerge, and the solutions must be searched in an alloying which changes the behaviour of zinc and copper at their boundary surface. According to the present invention, there is now developed a new copper alloy to be used in resistance welding electrodes, and owing to this new alloy, the service life of an electrode will be remarkably lengthened. According to the invention, the resistance welding electrode material is alloyed with tellurium or other chalcogene, such as selenium or sulphur, and thereby the qualifications set for electrode material can be met.

BRIEF DESCRIPTION OF THE DRAWINGS

The invention is described in more detail below, with reference to the appended drawings where.

DETAILED DESCRIPTION

Figure 1:
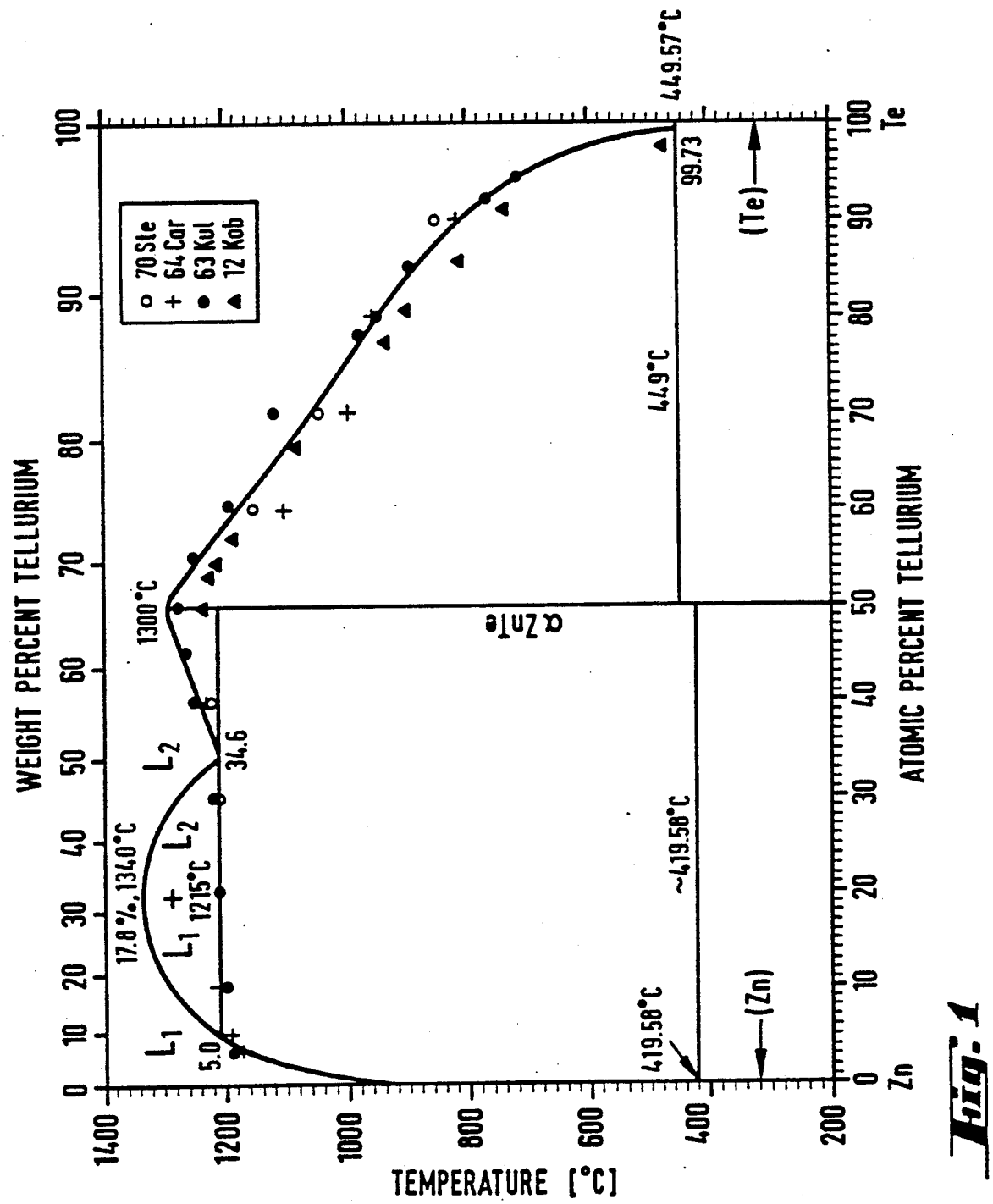
FIG. 1 is a zinc-tellurium phase diagram.

On the basis of recently made thermodynamic analyses (Sharma, R., Chang, Y.: The Te-Zn (Tellurium-Zinc) System, Bull. Alloy Phase Diagr. 8 (1987) 1, 14–19) it is apparent that the decisive alloy ingredient from the point of view of the behaviour of zinc is tellurium, Te, a relative of oxygen (as well as other elements of the chalcogene group, such as Se and S). According to the Zn-Te phase diagram of figure 1, it is concluded that the only intermetallic alloy in the system, ZnTe, is thermodynamically stabile in the working conditions, because the solubility of telluride to molten zinc is very low, and the melting temperature thereof is about 850° C. higher than that of its components.

Figure 2:
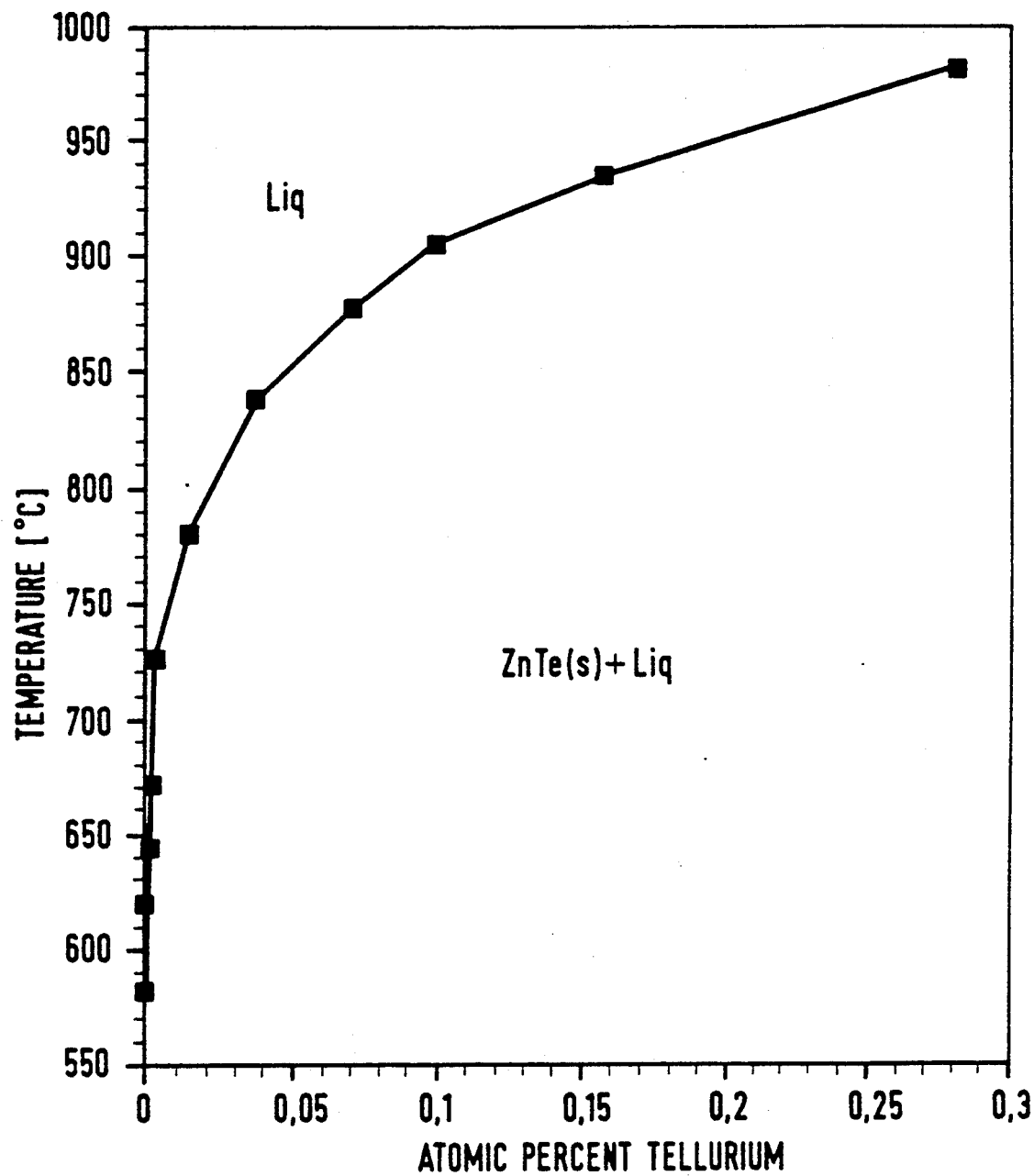
FIG. 2 illustrates the solubility of tellurium to molten zinc within the temperature range 550°–1000° C.

According to Sharma & Chang, the solubility of tellurium to a molten zinc system at the invariant temperature 419.59° C. is practically zero (at 580° C. 0.0009 atomic percents), and at 907° C. reaches the level of 0.1 atomic percents $(T)_{Zn}$. FIG. 2 illustrates, according to Sharma & Chang, a more detailed liquidus curve of zinc within the temperature range 550°-1000° C.

It is common knowledge that in solid state, tellurium is essentially completely precipitated from copper, forming copper(II)telluride, $Cu_2Te$, and the reactions of zinc with tellurium copper can be observed by means of a simple exchange reaction:

$$Cu_2Te(s) + Zn(l) = 2Cu(s) + ZnTe(s) \quad (1)$$

Figure 3:
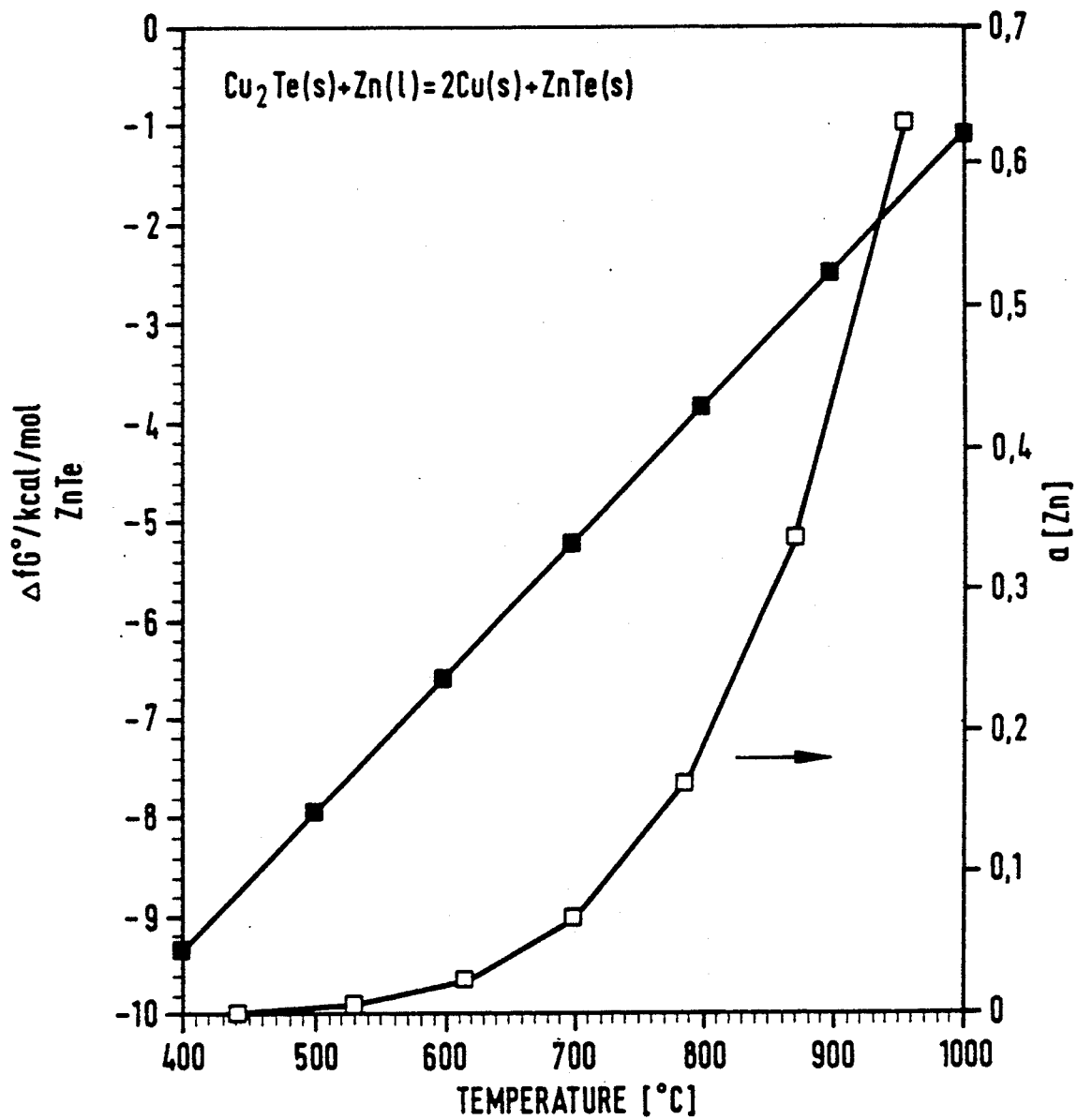
FIG. 3 illustrates the change in the Gibbs energy in the reaction between copper telluride and Zinc, and the activity of zinc, when $a_{Cu_2Te} = a_{Cu} = 1$.

According to Mills (Mills, K.: Thermodynamic Data for Inorganic Sulphides, Selenides and Tellurides, Butterworths, London 1974), a numeric value for the standard Gibbs energy of reaction (1) is obtained:

$$G°/kcal/mol = -18,500 + 13.6*T/K, \quad (2)$$

the behaviour whereof as a function of the temperature is illustrated in FIG. 3. The balance, particularly in the lower temperatures of the diagram, clearly falls on the side of the reaction products. Thus the molten zinc decomposes the less stabile copper telluride, itself forming solid zinc telluride.

FIG. 3 also illustrates the behaviour of zinc activity according to the phase diagram (1). According to the definition, it describes a situation where the reactivities of the other components participating in the reaction are $=1$, i.e. when $a_{Cu_2Te} = a_{ZnTe} = a_{Cu} = 1$.

FIG. 3 also shows that the activity of zinc (right axis) in the temperature range 500°-800° C. is low, below 0.2. The activity of zinc in the beta phase of the Cu-Zn system, at the phase boundary rich in zinc, is a limit value that in this situation defines the creation of brass in between the welding electrode and the zinc coating.

As a conclusion from the brief discussion above, the following facts are maintained:

1. The alloying of tellurium into copper strongly elevates the liquidus surface of the contacting zinc, the liquidus surface meaning the melting point within the temperature range 450°-700° C. Consequently, because the tellurium alloying prevents the alloying of zinc and copper, the result is that in between the zinc coating of the sheet and the boundary surface of the electrode, there are not created such alloys that could disturb welding by increasing the probability of sticking and thus shortening the service life of the electrode.

2. The effect of tellurium is remarkable even with very small tellurium contents. An addition of 20 ppm Te already creates a positive change in the electrode material. At the same time, tellurium strongly decreases the activity of zinc in the weld, thus limiting the creation of vapor.

3. Zinc is able to dissolve the copper tellurides $Cu_2Te$ which are precipitated in the copper, in which case the effect of these tellurides as a factor elevating the liquidus surface is equal to the effect of a pure tellurium addition into zinc.

4. Because selenium and sulphur belong to the same group of chalcogenes and are similar in type, the same result can be achieved when alloying these elements into the copper alloy.

Normally the copper alloy used for resistance welding electrodes is manufactured conventionally according to the melting—hot working—cold working method, and the electrodes are machined or cold-formed of the created bar of copper alloy. If, however, it is considered necessary to use a Te (Se, S) alloying higher than 2%, the created copper alloy is so fragile that its treatment is carried out powdermetallurgically. A tellurium alloying higher than 6% does not lead to any remarkable additional advantages. The copper alloy may contain only tellurium (or selenium or sulphur) as the alloy ingredient, or the alloy may also contain for instance a small amount of phosphorus. The copper alloy may also be one of the above mentioned alloys, where the hardening work and the half-softening temperature are increased by means of silver alloying; an amount of 0.05-2.0% chromium and/or zirconium or iron and phosphorus may also be added to the copper, in which case the mechanical strength values are improved and the half-softening temperature raised by means of precipitation hardening; the copper may also be dispersion hardened by means of aluminium oxide, zirconium oxide or titanium boride. The properties of these alloys, while they serve as resistance welding electrodes, can now be improved by means of the tellurium addition according to the present invention.

The above description speaks mainly of electrodes used in spot welding, but it is obvious that the electrodes of the invention may also be used in other types of resistance welding, such as projection welding, seam welding, upset welding and flash welding. Moreover, the electrode material of the invention is not limited to the welding of coated sheets only, but it can also be used for instance in the welding of aluminium.

The invention is further described with reference to the following examples:

EXAMPLE 1

By employing the conventional melting—hot working—cold working method, there is prepared the alloy CuTeP (Te 0.6%, P 70 ppm). By using an electrode formed of this copper alloy bar, there is achieved a remarkably longer service life for the electrode than with the electrodes used so far, while welding both hot galvanized and electrogalvanized sheet. The results are given in the table below:

| Electrode | Hot galvanized sheet (spots) | Electrogalvanized sheet (spots) |
|---|---|---|
| CuTeP | 4,040 | 11,800 |
| CuZr | 2,300 | 10,400 |
| CuCrlZr | 2,400 | 5,100 |
| DSCu | 3,900 | 8,000 |

EXAMPLE 2

In similar fashion, there is prepared a precipitation hardening alloy CuCrlZrTe (Cr 0.7%, Zr 0.1%, Te 0.4%). The results from the welding of electrogalvanized sheet, with comparisons, below:

| Electrode | Hot galvanized sheet (spots) | Electrogalvanized sheet (spots) |
|---|---|---|
| CuCrlZrTe | 4,060 | 19,200 |
| CuZr | 2,300 | 10,400 |
| CuCrlZr | 2,400 | 5,100 |

-continued

| Electrode | Hot galvanized sheet (spots) | Electrogalvanized sheet (spots) |
|---|---|---|
| DSCu | 3,900 | 8,060 |

I claim:

1. An alloy of copper containing a chalcogene, at least 0.05 percent of at least one of the elements selected from the group consisting of chromium, zirconium and iron, and at least 0.1 percent silver.

2. An alloy according to claim 1, wherein the amount of chalcogene in the alloy is between 20 ppm and 2%.

3. An alloy according to claim 1, wherein the amount of chalcogene in the alloy is between 2% and 6%.

4. An alloy according to claim 1, containing up to 6% silver.

5. An alloy according to claim 1, containing up to 2% chromium.

6. An alloy according to claim 1, containing up to 2% zirconium.

7. An alloy according to claim 1, containing a total of up to 2% chromium and zirconium.

8. An alloy according to claim 1, containing a total of up to 2% iron and phosphorus.

9. An alloy according to claim 1, wherein the alloy is precipitation hardened.

10. An alloy according to claim 1, prepared by powdermetallurgy.

11. An alloy according to claim 1, wherein the alloy is dispersion hardened.

12. An alloy according to claim 2, manufactured by the melting—hot working—cold working method.

13. An alloy according to claim 3, wherein the alloy is prepared powdermetallurgically.

14. An alloy according to claim 5, wherein the alloy is precipitation hardened.

15. An alloy according to claim 6, wherein the alloy is precipitation hardened.

16. An alloy according to claim 7, wherein the alloy is precipitation hardened.

17. An alloy of copper containing at least 20 ppm tellurium, selenium or sulfur, at least 0.05 percent of at least one of the elements selected from the group consisting of chromium, zirconium and iron, and at least 0.1 percent silver.

18. A welding electrode comprising an alloy of copper containing a chalcogene, at least 0.05 percent of at least one of the elements selected from the group consisting of chromium, zirconium and iron, and at least 0.1 percent silver, and wherein the electrode is manufactured by means of machining or forming.

* * * * *